United States Patent [19]
Koyama

[11] Patent Number: 5,798,746
[45] Date of Patent: Aug. 25, 1998

[54] LIQUID CRYSTAL DISPLAY DEVICE

[75] Inventor: Jun Koyama, Kanagawa, Japan

[73] Assignee: Semiconductor Energy Laboratory Co., Ltd., Kanagawa, Japan

[21] Appl. No.: 362,881

[22] Filed: Dec. 23, 1994

[30] Foreign Application Priority Data

Dec. 27, 1993 [JP] Japan .................. 5-354091
Dec. 27, 1993 [JP] Japan .................. 5-354092

[51] Int. Cl.⁶ .................. G09G 3/36; G02F 1/13
[52] U.S. Cl. .................. 345/98; 345/92; 345/89
[58] Field of Search .................. 345/89, 100, 92, 345/98, 90; 359/79, 56, 87

[56] References Cited

U.S. PATENT DOCUMENTS

| | | | |
|---|---|---|---|
| 4,773,738 | 9/1988 | Hayakawa et al. | 359/56 |
| 5,091,722 | 2/1992 | Kitajima et al. | 345/90 |
| 5,200,846 | 4/1993 | Hiroki et al. | 345/92 |
| 5,225,823 | 7/1993 | Kanaly | 345/89 |
| 5,349,366 | 9/1994 | Yamazaki et al. | 345/92 |
| 5,424,752 | 6/1995 | Yamazaki et al. | 345/92 |
| 5,471,225 | 11/1995 | Parks | 345/98 |
| 5,479,283 | 12/1995 | Kaneko et al. | 359/79 |
| 5,642,129 | 6/1997 | Zavracky et al. | 345/92 |

Primary Examiner—Mark R. Powell
Assistant Examiner—John Suraci
Attorney, Agent, or Firm—Sixbey, Friedman, Leedom & Ferguson, P.C.; Gerald J. Ferguson, Jr.

[57] ABSTRACT

In an active matrix type liquid crystal display device, a time gradation display manner for performing time gradation display is used. A digital gradation (voltage) signal on a signal line is supplied to the digital memory circuit arranged in vicinity of each pixel electrode and stored therein for a desired period of time. This storage state is held until next scanning is started. A high voltage or a low voltage supplied as a power source voltage of the digital memory circuit is applied to a pixel electrode while the digital memory circuit is in a storage state, so that a desired voltage is stably applied to the pixel electrode.

29 Claims, 8 Drawing Sheets

--- PIXEL VOLTAGE

—— TFT GATE VOLTAGE

DIGITAL MEMORY
CIRCUIT OUTPUT
VOLTAGE

FIG. 10A

OPPOSITE ELECTRODE
APPLYING VOLTAGE

FIG. 10B

LIQUID CRYSTAL
APPLYING VOLTAGE

LIQUID CRYSTAL DISPLAY DEVICE

BACKGROUND OF THE INVENTION

1. Field of the Invention

The present invention relates to an active matrix type liquid crystal display device, in particular, a liquid crystal display device for performing a digital gradation display.

2. Description of the Related Art

There is a conventional active matrix type liquid crystal display device for performing a digital gradation display, as described in Toshio Futami, Flat Panel Display '91, pp.173 to 180, 1990.

Figure 2:
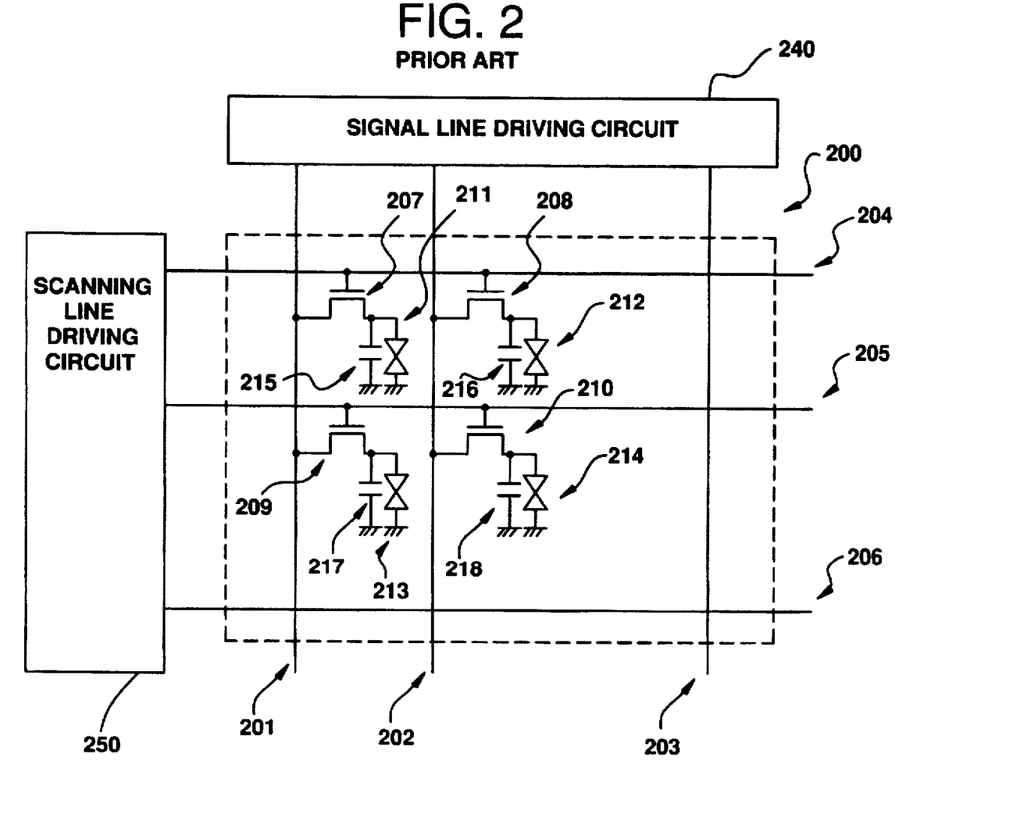
FIG. 2 shows an example of an active matrix type liquid crystal display device.

FIG.2 shows an example of an active matrix type liquid crystal display device. The active matrix type liquid crystal display device includes a pixel matrix portion 200, a signal line driving circuit 240 and a scanning line driving circuit 250.

In the pixel matrix portion 200, signal lines 201 to 203 and scanning lines 204 to 206 are arranged at a matrix form. Pixel thin film transistors (TFTs) 207 to 210 are arranged in intersection portions of the signal lines and the scanning lines. In each of the TFTs 207 to 210, a gate, a source and a drain are connected with the scanning line, the signal line and a pixel electrode, respectively. In general, since liquid crystals 211 to 214 arranged between the pixel electrodes and an opposite electrode cannot have a large capacitance value, storage capacitors 215 to 218 for storing charges are arranged in vicinity of the pixel electrodes.

When a voltage higher than a threshold voltage of the TFT is applied to the scanning line and the TFT is turned on, the drain and the source in the TFT are in a short circuit state. When a voltage on the signal line is applied to the pixel electrode, the liquid crystal and the storage capacitor are charged. On the other hand, when the TFT is turned off, since the drain and the source are in an open circuit state, charges in the liquid crystal and the storage capacitor are stored until the TFT is turned on.

Figure 3:
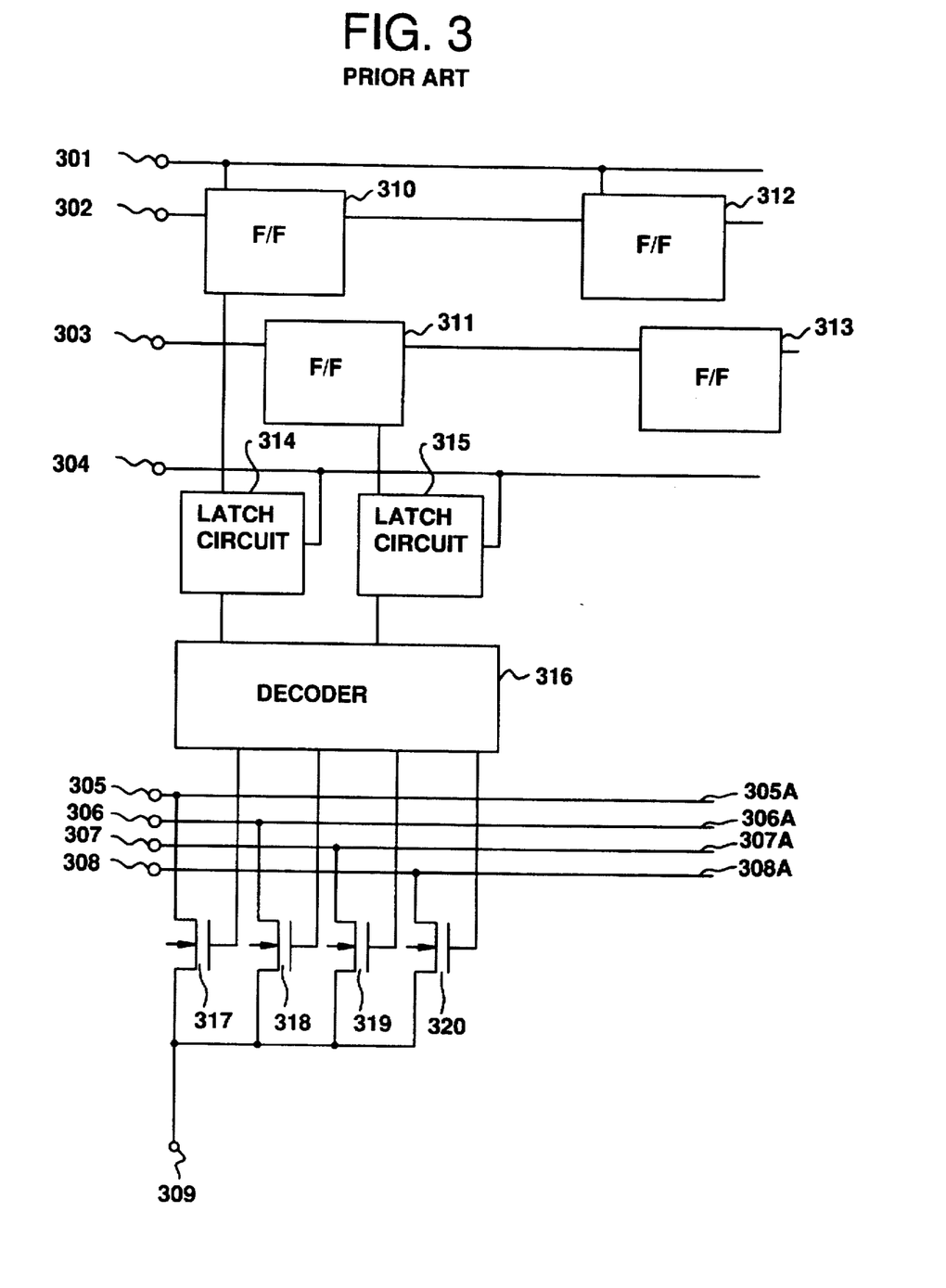
FIG. 3 shows an example of a signal line driving circuit.

FIG.3 shows an example of the 4-gradation signal line driving circuit 240. Note that the number of gradations is not limited to 4-gradations and the basic operation is the same. The signal line driving circuit 240 includes a clock signal input terminal 301, start pulse signal input terminals 302 and 303, a horizontal synchronizing signal input terminal 304, gradation (voltage) signal terminals 305 to 308, a signal line connection terminal 309, flip-flops (F/Fs) 310 to 313, latch circuits 314 and 315, a decoder 316, and TFTs 317 to 320.

Digital gradation signals as start pulse signals are supplied from the start pulse signal input terminals 302 and 303 to the flip-flops 310 and 311. Outputs of the flip-flops 310 and 311 are supplied to the flip-flops 312 and 313 and the latch circuits 314 and 315. Data supplied to the latch circuits 314 and 315 are stored for a desired period. The desired period is determined by a horizontal synchronizing signal supplied to the horizontal synchronizing signal input terminal 304. Output signals of the latch circuits 314 and 315 are supplied to the decider 316. A digital signal of two bits supplied to the decoder 316 is converted into one of four voltage selection signals in the decoder 316. One of the TFTs 317 to 320 as switch transistors is selected in accordance with the converted voltage selection signal, and one of the voltages on the gradation signal lines 305a to 308a is supplied to the signal line 309.

Figure 4A:
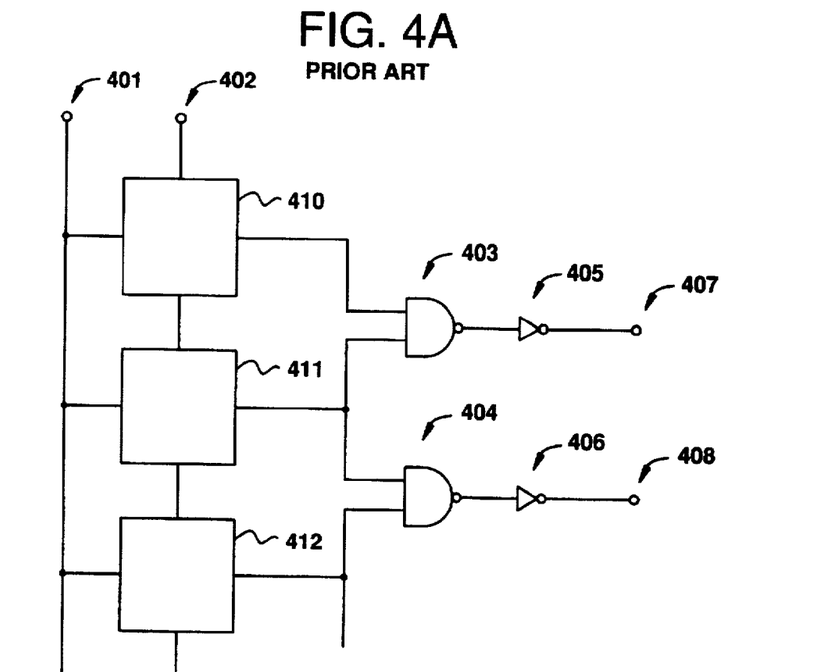
FIGS. 4A to 4C shows an example of a scanning line driving circuit.

Figs.4A shows an example of the scanning line driving circuit 250. The scanning line driving circuit 250 includes clocked invertor used circuits 410 to 412 (as shown in

2

Figure 4B:
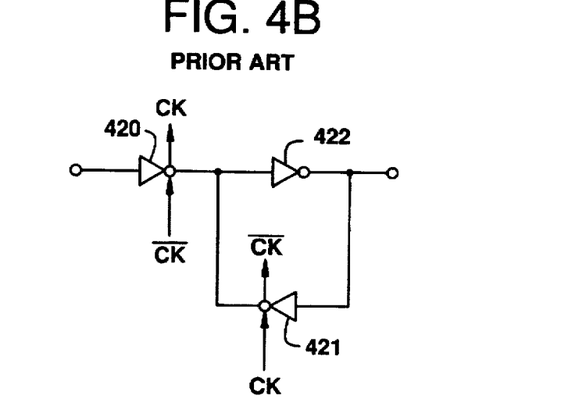
Figure 4C:
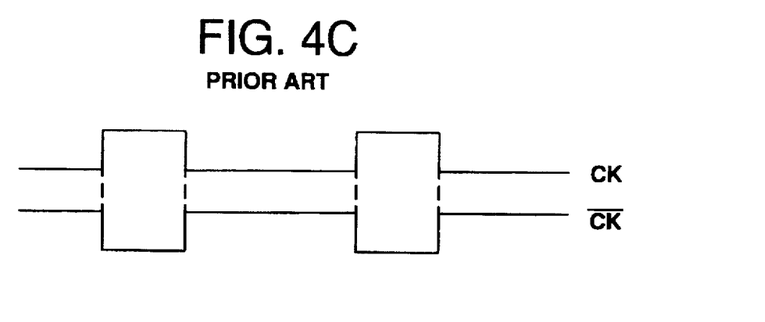

Figs.4B), NAND circuits 403 and 404 and invertor type buffers 405 and 406. The clocked invertor used circuit includes clocked invertors 420 and 421 operated by using a clock signal CK (as shown in FIG.4C) and an invertor 422. The start pulse signal which synchronizes a vertical synchronizing signal is input from a start pulse signal input terminal 402, and the clock pulse signal which synchronizes the horizontal synchronizing signal is input from a clock pulse signal input terminal 401. Therefore, the scanning lines are driven sequentially through scanning line connection terminals 407 and 408.

In the conventional liquid crystal display, there are the following two problems.

(1) When a TFT is turned off, a leakage current flows between a drain and a source, thereby to leak charges in pixels and to change a voltage applied to the liquid crystal.

Figure 5:
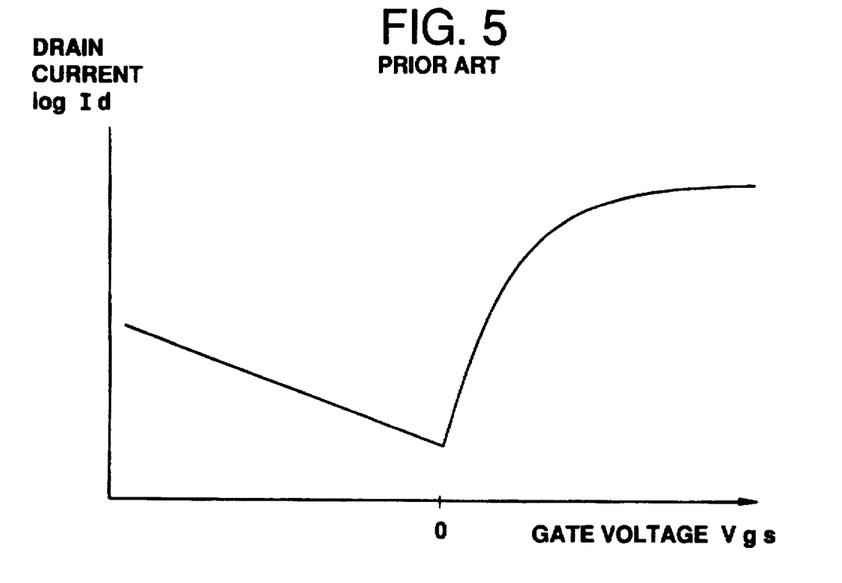
FIG. 5 shows a characteristic between a drain current and a gate voltage in a commonly used N-channel TFT.

FIG.5 shows a characteristic between a drain current Id and a gate voltage Ggs in a commonly used N-channel TFT. From FIG.5, even if the gate voltage is negative, a current flows into a drain and leakage of charge (discharge) produces by the current. In a P-channel TFT, the same discharge produces.

In general, since a pixel writing period (cycle) is 100 Hz or less, a voltage (data) storage time in a pixel is 10 ms or more. Since it is necessary to obtain a long period of time as the storage time, a storage capacitor is usually arranged in parallel to a liquid crystal. Note that a total capacitance of the liquid crystal and the storage capacitor is about 0.1 to 0.2 pF.

When the storage time in the pixel is 16.6 ms (60 Hz), a voltage applied to the liquid crystal is 5 V, a storage rate 99%, a capacitance is 0.2 pF, a admitting leakage current of a TFT is 5 V ×(1–0.99) ×0.2 pF/16.6 ms=0.6 pA. Since it is difficult to obtain this value in consideration of a temperature range to be used and deviation of a characteristic of the TFT, charges in pixels leak and image quality deteriorates.

(2) In operation of a TFT, when a scanning line voltage is changed form a high voltage to a low voltage or from a low voltage to a high voltage, the drain voltage is influenced to a scanning line voltage changing direction by ΔV calculated by the following equation in accordance with a capacitance between a gate and a drain in a TFT.

$$\Delta V = V \times Cgd/(Cgd + Clc + Cstg)$$

where V is a deviation of a scanning line voltage, Cgd is a capacitance value between a gate and a drain in a TFT, Clc is a capacitance value of a liquid crystal, Cstg is a capacitance value of a storage capacitor.

Figure 6:
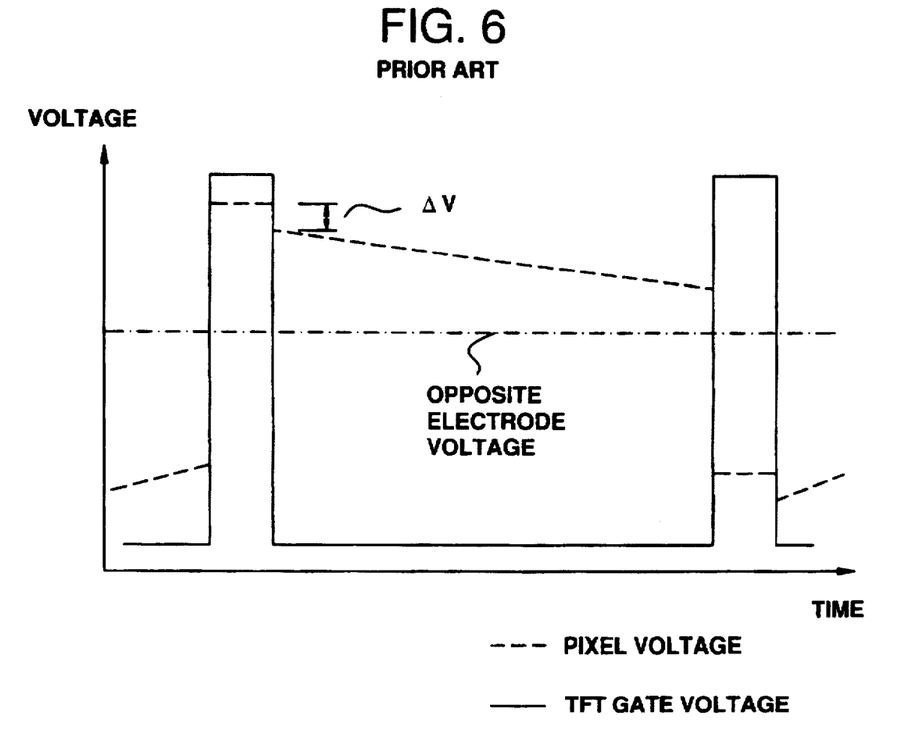
FIG. 6 shows an example of waveforms of voltages applied to a pixel electrode, an opposite electrode, and a gate of a TFT.

As a result, as shown in FIG. 6, a pixel voltage applied to a pixel electrode is shifted below, thereby to deteriorate a liquid crystal.

SUMMARY OF THE INVENTION

An object of the present invention is to solve the above problems, and to provide a liquid crystal display wherein charges can be stored irrespective of a storage time and a storage voltage is not changed by a change of a scanning line voltage. The liquid crystal display device of the present invention is a time gradation display type. A voltage applied to a pixel corresponds to a binary value. One digital memory circuit is arranged for one pixel electrode and output of the digital memory circuit is connected with the pixel electrode.

In the present invention, a voltage on a signal line is supplied to the digital memory circuit in accordance with a scanning line signal and is stored for a desired period of time. Since the pixel electrode is connected with the output of the digital memory circuit, a high voltage or a low voltage in the digital memory circuit is supplied to the pixel electrode while the digital memory circuit is in a storage state.

According to the present invention, there is provided a liquid crystal display device comprising: first and second substrates each having an insulating surface; at least one pixel electrode arranged on the first substrate at a matrix form; an opposite electrode arranged on the second substrate; a liquid crystal arranged between the first and second substrates; and at least one digital memory circuit which is constructed by thin film transistors, wherein the digital memory circuit is connected with the pixel electrode and stores a voltage to be supplied to the pixel electrode.

DETAILED DESCRIPTION OF THE PREFERRED EMBODIMENTS

Figure 1:
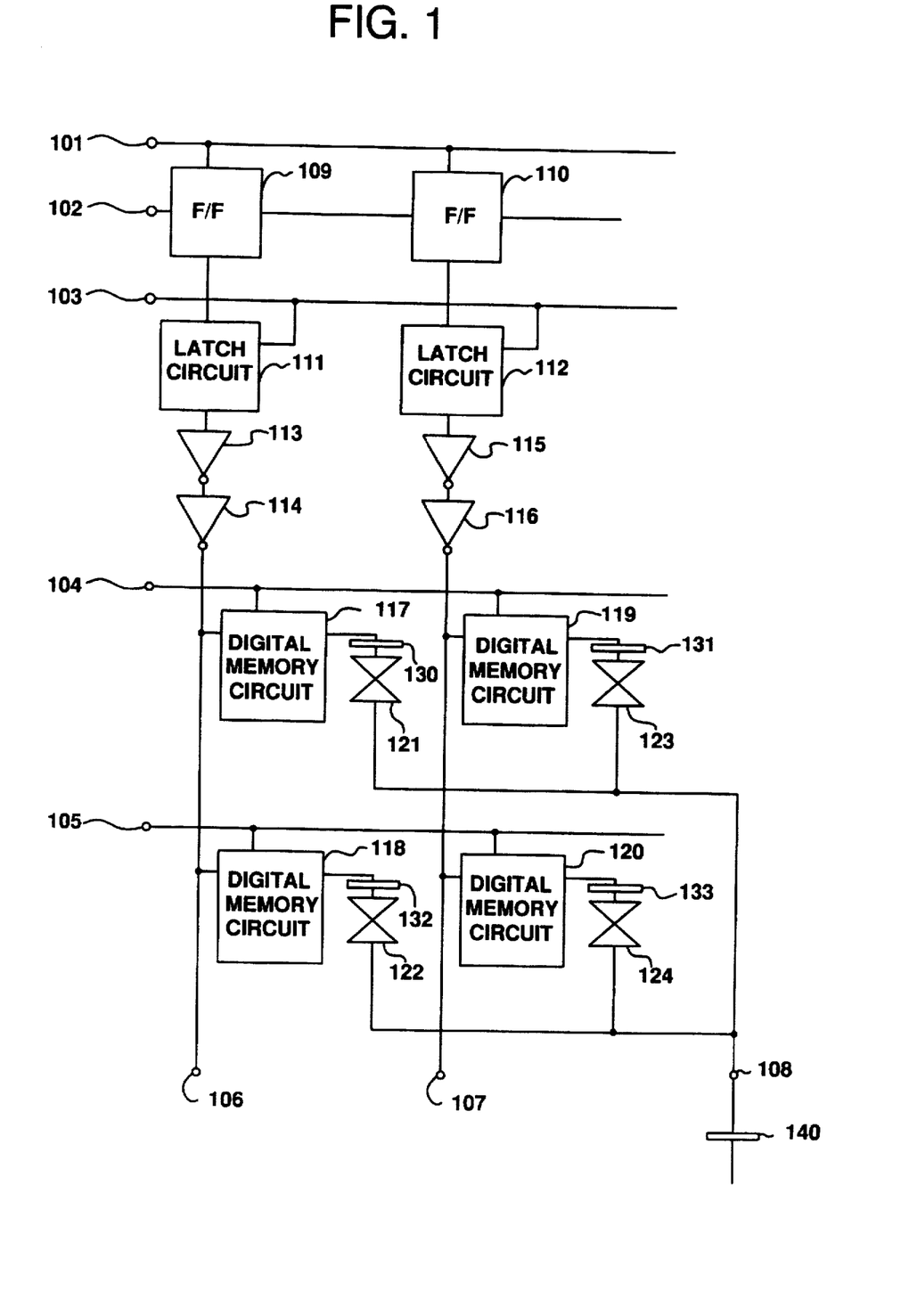
FIG. 1 shows a signal line driving circuit and an active matrix circuit in a liquid crystal display device, according to an embodiment of the present invention.
Figure 7:
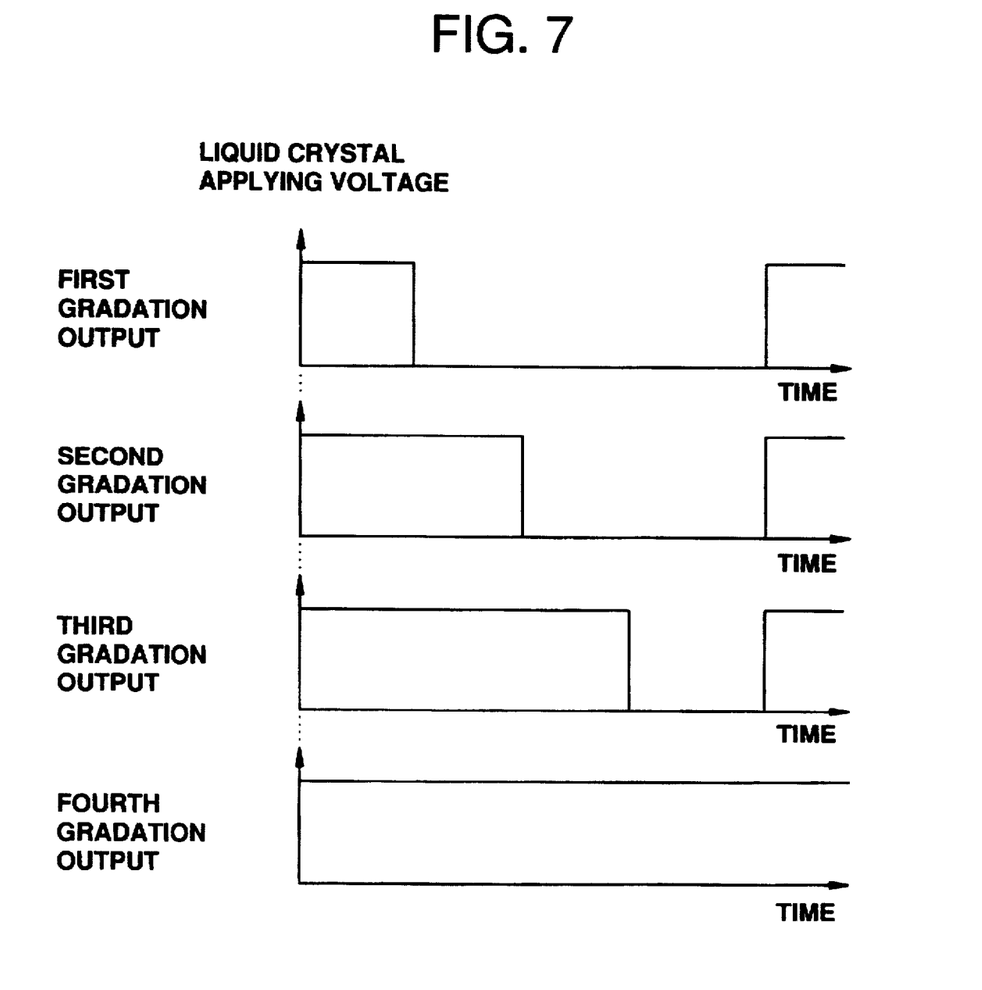
FIG. 7 is a view explaining a time gradation display manner.

FIG. 1 shows a signal line driving circuit and an active matrix circuit in a liquid crystal display device, according to an embodiment of the present invention. In a time gradation display manner, a half tone is displayed by changing between white and black in accordance with time elapse, as shown in FIG. 7.

The signal line driving circuit includes a clock signal input terminal 101, a start pulse signal input terminal 102, a horizontal synchronizing signal input terminal 103, scanning line connection terminals 104 and 105, signal line connection terminals 106 and 107, an opposite electrode connection terminal 108, flip-flops (F/Fs) 109 and 110, latch circuits 111 and 112, invertor type buffers 113 to 116, digital memory circuits 117 to 120, liquid crystals 121 to 124, pixel electrodes 130 to 133, and an opposite electrode 140. The liquid crystal 121 to 124 are arranged between the pixel electrodes 130 to 133 and the opposite electrode 140.

A digital gradation signal to be time-modulated as a start pulse signal is supplied from the start pulse signal input terminal 102 to the flip-flop 109. Outputs of the flip-flop 109 is supplied to the flip-flop 110 and the latch circuit 111.

Data supplied to the latch circuit 111 is stored for a desired period. The desired period is determined by a horizontal synchronizing signal supplied to the horizontal synchronizing signal input terminal 103. Output signals of the latch circuits 111 and 112 are supplied to the signal line connection terminals 106 and 107 through the invertor type buffers 113 to 116.

Data on the signal line connection terminals 106 and 107 are supplied to the digital memory circuits 117 to 120 arranged in vicinities of each of the pixel electrodes 130 to 133 in response to scanning line signals from the scanning line connection terminals 104 and 105. This storage state is held until a next scanning line signal is received.

Figure 8:
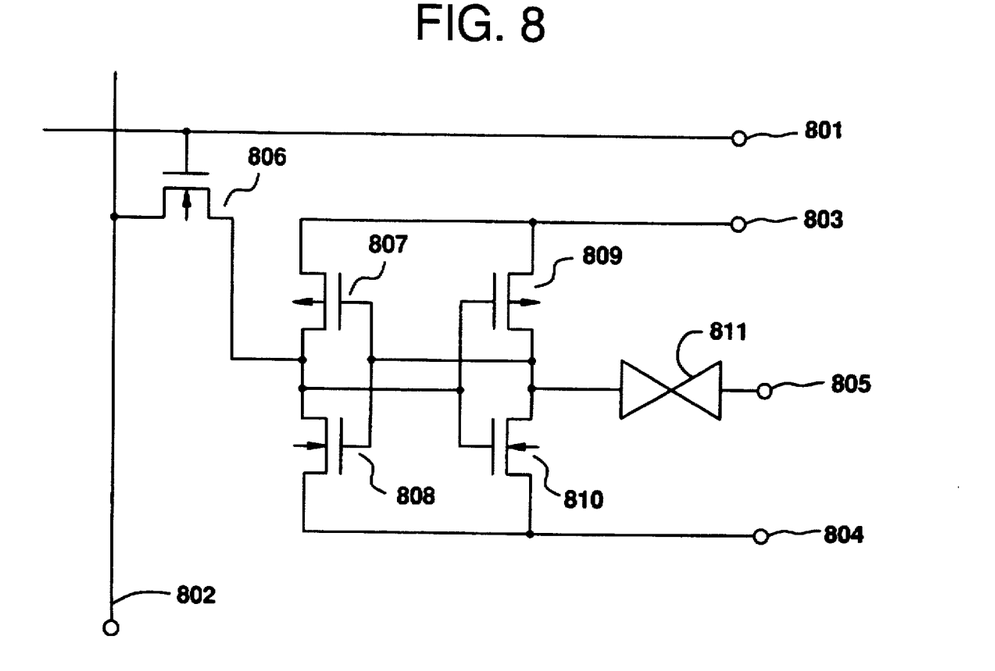
FIG. 8 shows a pixel portion including a digital memory circuit, according to an embodiment of the present invention.

FIG. 8 shows a pixel portion including a digital memory circuit, according to an embodiment of the present invention. The pixel portion includes a scanning line 801, a signal line 802, power source voltage terminals 803 and 804, an opposite electrode connection terminal 805, thin film transistors (TFTs) 806 to 810, and a liquid crystal 811.

In the digital memory circuit, an invertor constructed by the TFTs 807 and 808 and an invertor constructed by the TFTs 809 and 810 are integrated. When the TFT 806 is turned on, since the signal line 802 and the digital memory circuit is in a short circuit state, the signal line 802 is connected with the digital memory circuit and voltage data on the signal line 802 is stored in the digital memory circuit.

Since an output of the digital memory circuit is directly connected with the pixel electrode, a voltage on the pixel electrode is set to one of a high voltage and a low voltage as a power source voltage supplied from the power source voltage terminals 803 and 804. Therefore, Since a voltage on the pixel electrode is held by storing data in the digital memory circuit without storing a voltage into a capacitor, voltage deviation due to a leakage current of a pixel TFT and due to an off state of the TFT do not produce, thereby to improve an image quality.

Figure 10A:
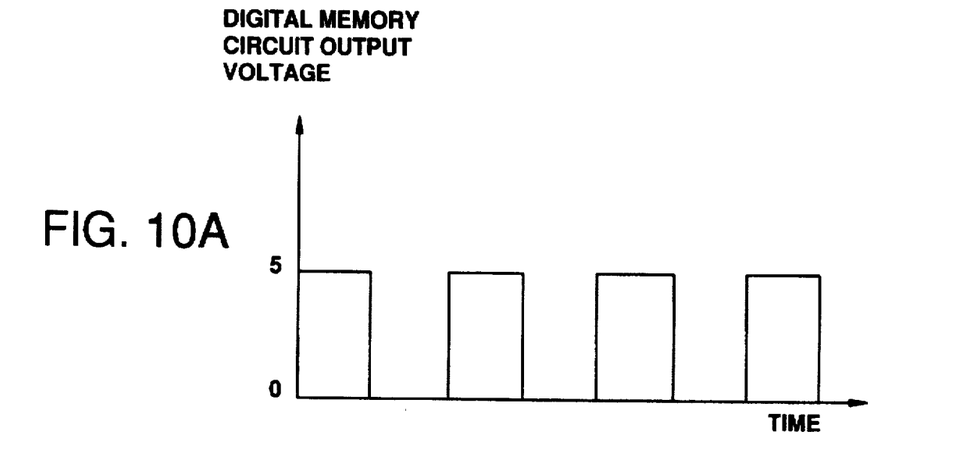
FIGS. 10A to 10C show waveforms of a digital memory circuit output voltage, an opposite electrode applying voltage, and a liquid crystal applying voltage.
Figure 10B:
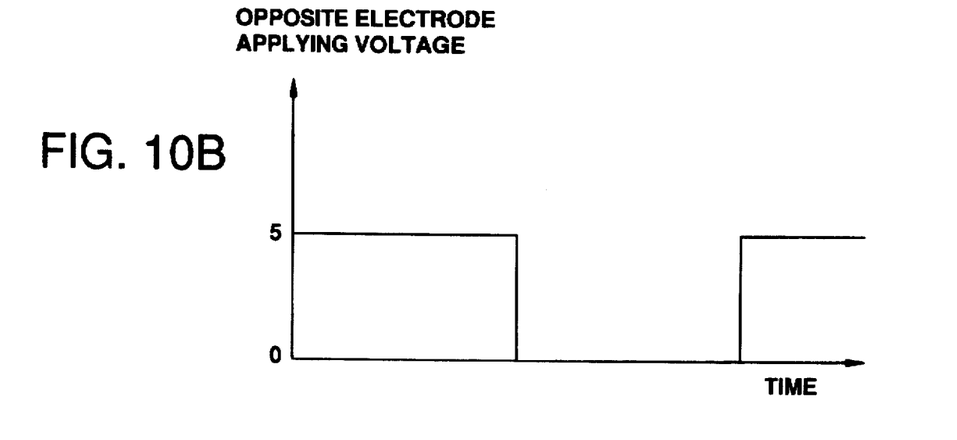
Figure 10C:
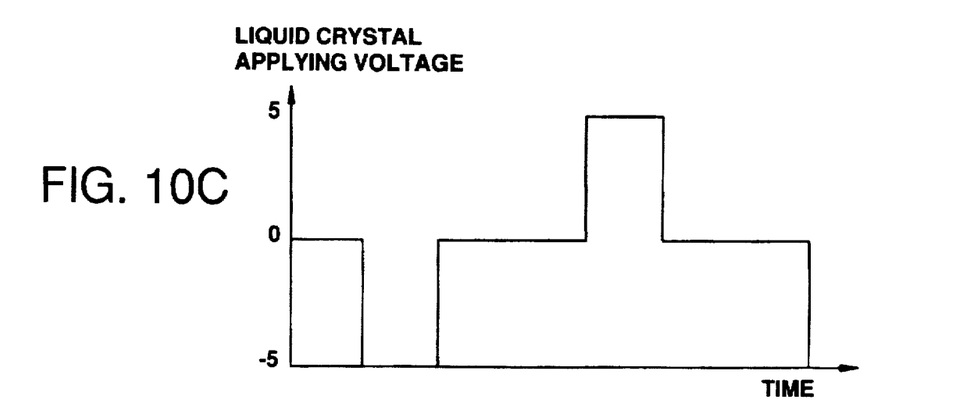

Also, when a direct current voltage is applied to a liquid crystal element for a long period of time, since the liquid crystal is deteriorated, a voltage having the same amplitude as output of the digital memory circuit and a desired frequency such as a vertical synchronizing frequency is applied to an opposite electrode, so that a voltage applied to the liquid crystal is approximately zero on a time average. The voltage having the same amplitude as output of the digital memory circuit and a desired frequency such as a vertical synchronizing frequency can be used as the power source voltage of the digital memory circuit. This relationship is shown in FIGS. 10A to 10C. FIGS. 10A to 10C show waveforms of a digital memory circuit output voltage, an opposite electrode applying voltage, and a liquid crystal applying voltage.

Figure 9:
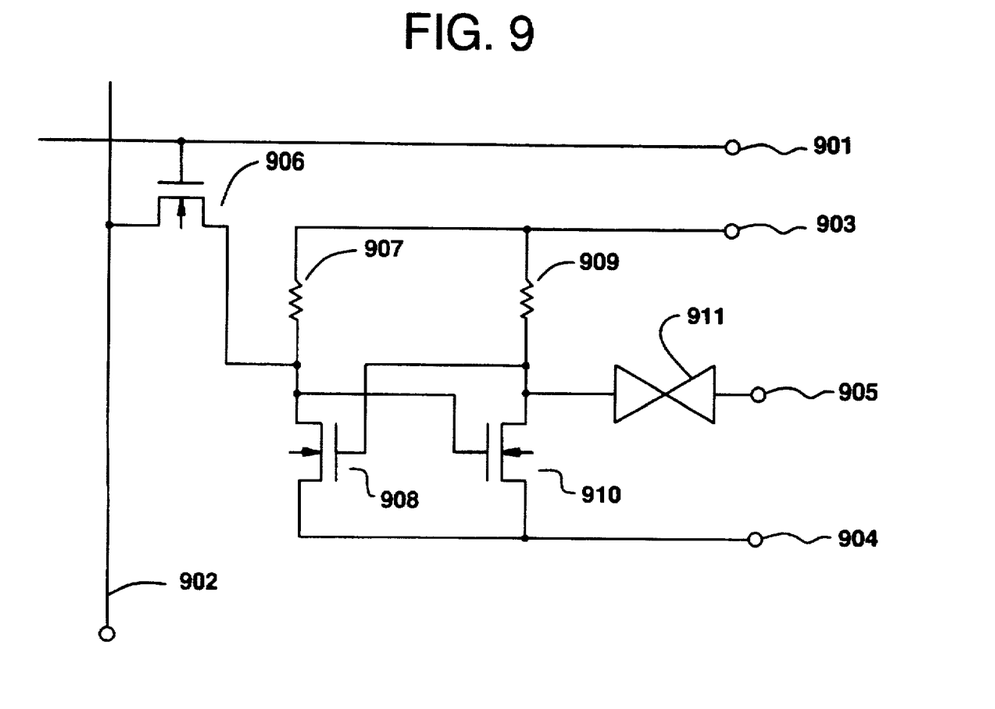
FIG. 9 shows a pixel portion including a digital memory circuit, according to another embodiment of the present invention.

FIG. 9 shows a pixel portion including a digital memory circuit, according to another embodiment of the present invention. The pixel portion includes a scanning line 901, a signal line 902, power source terminals 903 and 904, an opposite electrode connection terminal 905, thin film transistors (TFTs) 906, 908 and 910, resisters 907 and 909, and a liquid crystal 911. In the digital memory circuit, an invertor constructed by the TFTs 908 and 910 and the resisters 907 and 909 are used. The operation is the same as the digital memory circuit of FIG. 8. In this case, it is possible that a polarity of a TFT in a pixel matrix portion is only one type, that is, a P-channel type or an N-channel type.

As described above, time gradation display manner is used in the present invention. Since a digital memory circuit can be arranged every pixel electrode to supply a voltage to each the pixel electrode, a voltage on the pixel electrode can be constant. Therefore, image quality can be improved.

What is claimed is:

1. A liquid crystal display device comprising:

first and second substrates each having an insulating surface;

at least one pixel electrode arranged on the first substrate at a matrix form;

an opposite electrode arranged on the second substrate;

a liquid crystal disposed between the first and second substrates; and at least one digital memory circuit which is constructed by thin film transistors, wherein the digital memory circuit is connected with the pixel electrode and stores a binary information;

wherein a voltage is directly applied to said pixel electrode through said digital memory circuit based on said binary information, wherein said liquid crystal display device includes a time gradation display device.

2. The device of claim 1 wherein a voltage having an amplitude equivalent to that of the voltage stored in the digital memory circuit is supplied to the opposite electrode.

3. The device of claim 1 wherein the number of pixel electrodes equals to the number of the digital memory circuit.

4. The device of claim 1 wherein the liquid crystal display device includes a digital gradation display device.

5. The device of claim 1 wherein the voltage includes one of a high voltage and a low voltage.

6. An active matrix display device having an electro-optical modulating layer disposed between a pair of substrate, said active matrix display device comprising:

a plurality of column lines and a plurality of row lines supported by one of the substrates and defining a plurality of pixels in a matrix form;

a plurality of pixel electrodes formed in said plurality of pixels and supported by said one of said substrates;

a thin film transistor disposed in each of said pixels and electrically connected to one of said column lines and one of said row lines;

a memory circuit disposed in each of said pixels and electrically connected to said thin film transistor, wherein said memory circuit stores an information output by said thin film transistor; and at least two signal lines electrically connected to said memory circuit and the corresponding pixel electrode, wherein different voltages are applied to said pixel electrode through said at least two signal lines based on the information stored by the corresponding memory circuit.

7. The active matrix display device of claim 6 further comprising an opposite electrode on the other of said substrates, wherein an AC voltage having an amplitude equivalent to that of the voltages output of the memory circuit is supplied to the opposite electrode.

8. The active matrix display device of claim 6 wherein the number of pixel electrodes equals to the number of the memory circuit.

9. The active matrix display device of claim 6 wherein the active matrix display device includes a digital gradation display device.

10. The active matrix display device of claim 6 wherein the active matrix display device includes a time gradation display device.

11. The active matrix display device of claim 6 wherein the different voltages include a high voltage and a low voltage.

12. An active matrix display device having an electro-optical modulating layer disposed between a pair of substrate, said active matrix display device comprising:

a plurality of column lines and a plurality of row lines supported by one of the substrates and defining a plurality of pixels in a matrix form;

a plurality of pixel electrodes formed in said plurality of pixels and supported by said one of said substrates;

a first thin film transistor disposed in each of said pixels and electrically connected to one of said column lines and one of said row lines;

a memory circuit disposed in each of said pixels and electrically connected to said first thin film transistor, wherein said memory circuit stores an information output by said first thin film transistor; and at least two signal lines electrically connected to said memory circuit and the corresponding pixel electrode, wherein different voltages are applied to said pixel electrode through said at least two signal lines based on the information stored by the corresponding memory circuit, and wherein said memory circuit comprises at least second and third thin film transistors, one of source or drain of the second thin film transistor being connected with one of said signal lines, a gate electrode of the third thin film transistor, and one of source or drain of the first thin film transistor, the other of source or drain of the second transistor being connected with the other of said signal lines and one of source or drain of the third thin film transistor, and a gate electrode of the second thin film transistor being connected with the other of source or drain of the third thin film transistor, one of said signal lines, and said electro-optical modulating layer.

13. The active matrix display device of claim 12 wherein a voltage supplied to the the electro-optical modulating layer is substantially zero on time average.

14. The active matrix display device of claim 12 wherein the number of pixel electrodes equals to the number of the memory circuit.

15. The active matrix display device of claim 12 wherein the active matrix display device includes a digital gradation display device.

16. The active matrix display device of claim 12 wherein the active matrix display device includes a time gradation display device.

17. The active matrix display device of claim 12 wherein the different voltages include a high voltage and a low voltage.

18. An active matrix display device having an electro-optical modulating layer disposed between a pair of substrate, said active matrix display device comprising:

a plurality of column lines and a plurality of row lines supported by one of the substrates and defining a plurality of pixels in a matrix form;

a plurality of pixel electrodes formed in said plurality of pixels and supported by said one of said substrates;

a first thin film transistor disposed in each of said pixels and electrically connected to one of said column lines and one of said row lines;

a memory circuit disposed in each of said pixels and electrically connected to said first thin film transistor, wherein said memory circuit stores an information output by said first thin film transistor; and at least two signal lines electrically connected to said memory circuit and the corresponding pixel electrode, wherein different voltages are applied to said pixel electrode through said at least two signal lines based on the information stored by the corresponding memory circuit, and wherein said memory circuit comprises at least two invertors, said invertors comprising at least two thin film transistors and being connected with said signal lines.

19. The active matrix display device of claim 18 wherein the number of pixel electrodes equals to the number of the memory circuit.

20. The active matrix display device of claim 18 wherein the active matrix display device includes a digital gradation display device.

21. The active matrix display device of claim 18 wherein the active matrix display device includes a time gradation display device.

22. The active matrix display device of claim 18 wherein the different voltages include a high voltage and a low voltage.

23. The active matrix display device of claim 18 further comprising an opposite electrode on the other of said substrates, wherein an AC voltage having an amplitude equivalent to that of the voltages output of the memory circuit is supplied to the opposite electrode.

24. An active matrix display device having an electro-optical modulating layer disposed between a pair of substrate, said active matrix display device comprising:

a plurality of column lines and a plurality of row lines supported by one of the substrates and defining a plurality of pixels in a matrix form;

a plurality of pixel electrodes formed in said plurality of pixels and supported by said one of said substrates;

first thin film transistor disposed in each of said pixels and electrically connected to one of said column lines and one of said row lines;

a memory circuit disposed in each of said pixels and electrically connected to said first thin film transistor, wherein said memory circuit stores an information output by said first thin film transistor; and at least two signal lines electrically connected to said memory circuit and the corresponding pixel electrode, wherein different voltages are applied to said pixel electrode through said at least two signal lines based on the information stored by the corresponding memory circuit, and wherein said memory circuit comprises at least two thin film transistors, having a same conductivity type.

25. The active matrix display device of claim 24 wherein a voltage supplied to the electro-optical modulating layer is substantially zero on time average.

26. The active matrix display device of claim 24 wherein the number of pixel electrodes equals to the number of the memory circuit.

27. The active matrix display device of claim 24 wherein the active matrix display device includes a digital gradation display device.

28. The active matrix display device of claim 24 wherein the active matrix display device includes a time gradation display device.

29. The active matrix display device of claim 24 wherein the different voltages include a high voltage and a low voltage.

* * * * *